United States Patent [19]

Richter et al.

[11] Patent Number: 4,474,215

[45] Date of Patent: Oct. 2, 1984

[54] PRESSURE VESSEL WITH IMPROVED DIAPHRAGM MOUNTING

[75] Inventors: Karl W. Richter, Brookfield; Robert M. Schurter, West Bend, both of Wis.

[73] Assignee: A.O. Smith Corporation, Milwaukee, Wis.

[21] Appl. No.: 496,137

[22] Filed: May 19, 1983

[51] Int. Cl.³ .............................................. F16L 55/04
[52] U.S. Cl. .................................... 138/30; 277/166; 277/186
[58] Field of Search ................. 220/85 B; 138/30; 73/278; 92/98 R, 98 D, 169; 277/166, 181, 186, 189

[56] References Cited

U.S. PATENT DOCUMENTS

| 2,742,785 | 4/1956 | St. Clair | 73/279 |
|---|---|---|---|
| 3,136,229 | 6/1964 | Bauman | 92/98 D |
| 3,153,988 | 10/1964 | Warstler | 92/98 D |
| 3,165,229 | 1/1965 | Paul | 138/30 |
| 3,288,168 | 11/1966 | Mercier et al. | 138/30 |
| 3,623,512 | 11/1971 | Ellwanger | 138/30 |
| 3,788,358 | 1/1974 | Taki | 138/30 |
| 3,960,178 | 6/1976 | Mercier | 138/30 |
| 4,010,773 | 3/1977 | Bihlmaier | 138/30 |
| 4,098,297 | 4/1978 | Zahid | 138/30 |
| 4,129,025 | 12/1978 | Carey et al. | 138/30 |
| 4,234,016 | 11/1980 | Horino | 138/30 |
| 4,295,492 | 10/1981 | Zahid | 138/30 |
| 4,321,949 | 3/1982 | Mercier | 138/30 |

FOREIGN PATENT DOCUMENTS 2242942 3/1974 Fed. Rep. of Germany ........ 138/30

Primary Examiner—John W. Shepperd
Attorney, Agent, or Firm—Andrus, Sceales, Starke & Sawall

[57] ABSTRACT

A pressure vessel (1) includes a pair of shells (2,3) which are suitably joined together. A flexible diaphragm (12) is disposed within the vessel and sealingly mounted to the vessel walls adjacent the joint. The lower shell wall (5) has a radially outwardly extending offset (17) and bulge (19) forming an interior groove (20) for receiving a projection (16) on the diaphragm. The bulge merges into an inwardly tapered wall (21) which in turn merges into an axial cylindrical wall (23) having a terminus edge (24). The upper shell wall (4) has a pair of spaced radially inwardly extending offsets (25,28). The upper (25) of said pair of offsets provides an abutment (26) receiving the terminus edge (24) of the lower shell. An axial cylindrical wall (29) between the pair of inward offsets press-fittingly engages the upper edge portion (23) of the lower shell. A further cylindrical wall (30) extends downwardly from the lower (28) of said pair of offsets and compressingly engages the diaphragm (12) so that it tends to ride down the inclined ramp-like tapered wall (21) and tightens into the groove (20) during assembly. The further cylindrical wall (30) merges into an inwardly tapered protective lip (32).

1 Claim, 2 Drawing Figures

PRESSURE VESSEL WITH IMPROVED DIAPHRAGM MOUNTING

U.S. PRIOR ART OF INTEREST

| U.S. Pat. No. | Inventor | Issue Date |
| --- | --- | --- |
| 2,742,785 | St. Clair | Apr. 24, 1956 |
| 3,288,168 | Mercier et al. | Nov. 29, 1966 |
| 3,788,358 | Taki | Jan. 29, 1974 |
| 3,960,178 | Mercier | Jun. 1, 1976 |
| 4,098,297 | Zahid | Jul. 4, 1978 |
| 4,129,025 | Carey et al. | Dec. 12, 1978 |
| 4,234,016 | Horino | Nov. 18, 1980 |
| 4,295,492 | Zahid | Oct. 20, 1981 |
| 4,321,949 | Mercier | Mar. 30, 1982 |

BACKGROUND AND SUMMARY OF THE INVENTION

This invention relates to pressure vessels and more particularly to a peripheral mounting for resilient flexible elements such as diaphragms and the like used to separate a vessel into several chambers.

Numerous constructions for sealingly joining the edge of an internal diaphragm to the walls of a pressure vessel are known. See the above-identified patents, and especially U.S. Pat. No. 4,321,949.

The present invention is directed to an improved and simplified mounting construction which firmly and sealingly holds the diaphragm in place and protects it against damage during flexing.

In accordance with the various aspects of the present invention, a pressure vessel includes a pair of shells which are suitably joined together. A flexible diaphragm is disposed within the vessel and sealingly mounted to the vessel walls adjacent the joint. The lower shell wall has a radially outwardly extending offset and bulge forming an interior groove for receiving a projection on the diaphragm. The bulge merges into an inwardly tapered wall which in turn merges into an axial cylindrical wall having a terminus edge. The upper shell wall has a pair of spaced radially inwardly extending offsets. The upper of said pair of offsets provides an abutment receiving the terminus edge of the lower shell. An axial cylindrical wall between the pair of inward offsets press-fittingly engages the upper edge portion of the lower shell. A further cylindrical wall extends downwardly from the lower of said pair of offsets and compressingly engages the diaphragm so that it tends to ride down the inclined ramp-like tapered wall and tightens into the groove during assembly. The further cylindrical wall merges into an inwardly tapered protective lip.

BRIEF DESCRIPTION OF THE DRAWINGS

The accompanying drawings illustrate the best mode presently contemplated by the inventors for carrying out the invention.

In the drawings.

DESCRIPTION OF THE PREFERRED EMBODIMENT

Figure 1:
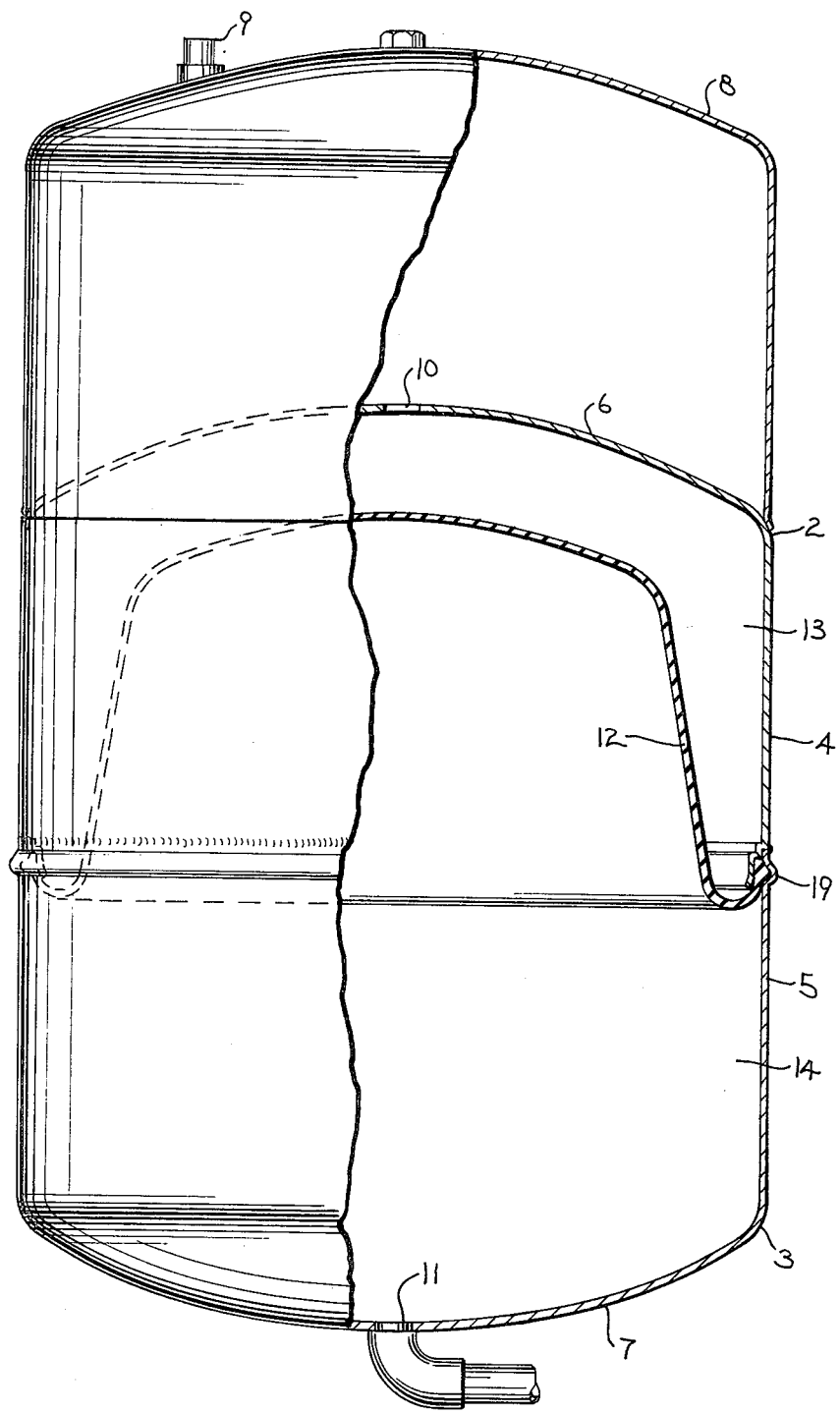
FIG. 1 is a side elevation of a pressure vessel constructed in accordance with the various aspects of the invention, with parts broken away and in section.

As shown in the drawings, the concepts of the invention are adapted for use in a pressure vessel comprising a cylindrical tank 1 formed by an upper open-mouthed shell section 2 and a lower open-mouthed shell section 3, each having axially extending cylindrical walls 4 and 5 and end walls 6 and 7 respectively.

In the present embodiment, a cap or cover 8 is mounted to shell 2 and is provided with a fluid inlet 9. A port 10 in end wall 6 permits fluid communication between the interior of cover 8 and the interior of shell 2. An outlet 11 provides for fluid discharge from the interior of shell 3.

Shells 2 and 3 are joined together at their open ends and a flexible resilient diaphragm 12 separates the shell assembly into two chambers 13 and 14 of variable volume.

Diaphragm 12 is shown in an upper flexed position and is peripherally sealed to tank 1 adjacent the joint between shells 2 and 3. For this purpose, the peripheral portion of diaphragm 12 is generally flat and straight on one face, as at 15, and is provided with a projection 16 on the side remote from face 15.

In the construction disclosed, lower shell wall 5 is provided with a radially outwardly extending offset 17 forming an interior shoulder 18 and an exterior wall bulge 19 forming an interior peripheral groove 20 within which diaphragm projection 16 is received. Bulging wall portion 19 merges into a planular wall portion 21 which is tapered upwardly and inwardly at an acute angle, and in turn merges at 22 into an axially extending cylindrical wall portion 23 having an end edge 24.

As shown, upper shell wall 4 is provided with a first radially inwardly extending offset 25 forming a peripheral abutment 26 against which end edge 24 engages. A peripheral weld 27 sealingly secures shells 2 and 3 together in the area of the abutting walls. A second radially inwardly extending offset 28 is spaced from offset 25, forming therebetween an intermediate axially extending cylindrical wall portion 29 of reduced diameter which is press fit within wall portion 23 of the lower shell 3. Offset 28 terminates above merger point 22. Another cylindrical wall 30 of further reduced diameter extends axially from offset 28 on the side remote from wall 29, with wall 30 compressively engaging face 15 of diaphragm 12. The lower or outer end portion of wall 30 merges at 31 into an inwardly and downwardly tapered lip 32 which terminates at an edge 33 disposed below shoulder 18 and groove 20 and forms an acute angle with shell wall 5. Lip 32 is formed to protect the diaphragm portion 34 which extends freely outwardly from groove 20 against damage during flexure thereof.

In assembling the device, diaphragm projection 16 is first placed in peripheral groove 20, where it tends to hang. Shell 2 is then lowered onto shell 3 with wall 29 being press fit into wall 23 and wall 30 sliding down into compressing engagement with diaphragm face 15. This causes diaphragm projection 16 to tend to ride down the ramp-like tapered wall 21 so that it sealingly tightens within groove 20. When edge 24 is engaged by abutment 26, weld 27 is made to seal the joint.

Figure 2:
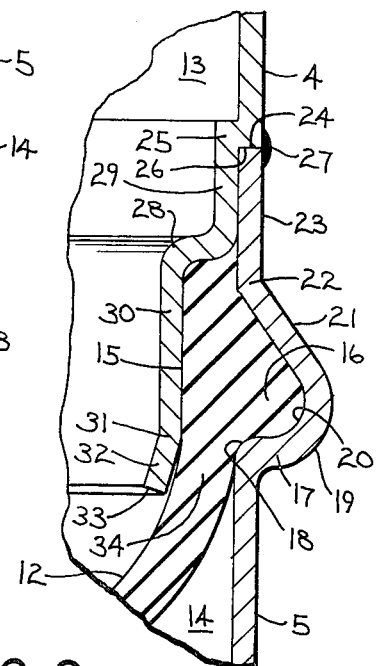
FIG. 2 is an enlarged fragmentary section showing the construction of the diaphragm mount.

In the assembled state of the elements, as shown in FIG. 2, the peripheral edge portion of diaphragm 12 is sealingly confined by offset 17, groove 20, walls 21 and 23, offset 28 and wall 30.

The concepts of the invention provide a unique mounting for a diaphragm used to separate a pressure accumulator into several chambers.

Various modes of carrying out the invention are contemplated as being within the scope of the following claims particularly pointing out and distinctly claiming the subject matter which is regarded as the invention.

We claim:

1. A pressure vessel comprising:
   (a) first and second vessel shells 3, 2 and with said shells having cylindrical side walls 5, 4, open mouths and closed ends 7, 6,
   (b) a flexible resilient diaphragm 12 disposed within said vessel and separating the latter into variable volume chambers, said diaphragm having a peripheral edge portion,
   (c) the cylindrical wall 5 of said first vessel shell 3 having a radially outwardly extending offset 17 merging into an exterior bulge 19 forming an interior peripheral groove 20 within which said edge portion of said diaphragm is disposed,
   (d) a radially inwardly tapered wall 21 extending from said bulge 17 and with said tapered wall merging into an axially extending cylindrical shell end portion 23 having a peripheral edge 24,
   (e) the cylindrical wall 4 of said second vessel shell 2 having a first radially inwardly extending offset 25 forming an abutment 26 engaged by said peripheral edge 24 of said first shell 3 to form a joint between said shells,
   (f) a second radially inwardly extending offset 28 on said second shell 2 and spaced axially from said first inwardly extending offset 25,
   (g) wall means 29 disposed between said first and second offsets and with said wall means press-fittingly engaging said axially extending shell end portion 23,
   (h) a further axially extending cylindrical wall 30 extending from said second inwardly extending offset 28 on the side of said last-named offset remote from said wall means 29, said further wall 30 being disposed generally radially opposite of said groove 20 and engaging said peripheral edge portion of said diaphragm 12,
   (i) one side of the periphery of said diaphragm 12 being generally flat to provide a face 15 engaged by said further cylindrical wall 30,
   (j) the other side of the periphery of said diaphragm 12 being provided with a projection 16 disposed in said groove 20,
   (k) and a radially inwardly tapered diaphragm protecting lip 32 forming the end of said further cylindrical wall 30,
   (l) said radially outwardly extending offset forming an interior shoulder 18,
   (m) said second radially inwardly extending offset 28 being disposed axially between said joint and the area 22 of merging of the said tapered wall 21 into said cylindrical shell end portion 23,
   (n) said diaphragm extending freely outwardly from said groove 20 and between said interior shoulder 18 and said tapered lip 32,
   (o) said radially inwardly tapered wall 21 on said first vessel shell 3 comprising, during assembly, inclined ramp means along which said peripheral edge portion of said diaphragm 12 rides for tightening into said groove 20,
   (p) the said peripheral edge of said diaphragm 12 being confined by said radially outwardly extending offset 17, said groove 20, said inwardly tapered wall 21, said shell end portion 23, said second radially inwardly extending offset 28, and said further cylindrical wall 30.

* * * * *